(12) United States Patent
Hirano

(10) Patent No.: US 12,385,520 B2
(45) Date of Patent: Aug. 12, 2025

(54) BALL JOINT

(71) Applicant: NIFCO INC., Yokosuka (JP)

(72) Inventor: Yoichi Hirano, Kanagawa (JP)

(73) Assignee: NIFCO INC., Yokosuka (JP)

( * ) Notice: Subject to any disclaimer, the term of this patent is extended or adjusted under 35 U.S.C. 154(b) by 443 days.

(21) Appl. No.: 17/928,873

(22) PCT Filed: May 11, 2021

(86) PCT No.: PCT/JP2021/017914
§ 371 (c)(1),
(2) Date: Nov. 30, 2022

(87) PCT Pub. No.: WO2021/251047
PCT Pub. Date: Dec. 16, 2021

(65) Prior Publication Data
US 2023/0235779 A1  Jul. 27, 2023

(30) Foreign Application Priority Data
Jun. 12, 2020  (JP) .................................. 2020-102230

(51) Int. Cl.
*F16C 11/06*  (2006.01)
(52) U.S. Cl.
CPC ................................ *F16C 11/0657* (2013.01)
(58) Field of Classification Search
CPC .............. F16C 11/0619; F16C 11/0623; F16C 11/0657; F16C 11/069; F16C 11/0695;
(Continued)

(56) References Cited

U.S. PATENT DOCUMENTS 4,701,064 A * 10/1987 Mizusawa ........... F16C 11/0657
403/141
5,322,252 A *  6/1994 Puente ................. B60Q 1/0683
248/222.12

(Continued)

FOREIGN PATENT DOCUMENTS

DE        19629917 A1 *  1/1997  ........... B60Q 1/0683
DE   102013102197 A1 *  9/2013  ............. B60Q 1/068

(Continued)

OTHER PUBLICATIONS

PCT International Search Report for Patent Application PCT/JP2021/017914 mailed Jun. 22, 2021; 3 pp.

*Primary Examiner* — Amber R Anderson
*Assistant Examiner* — Kevin J Baynes
(74) *Attorney, Agent, or Firm* — Armstrong Teasdale LLP

(57) ABSTRACT

A ball joint includes a ball stud and a socket having a base portion that is annular about an axis extending in an insertion direction, multiple first protruding parts, and second protruding parts positioned between the first protruding parts. The second protruding parts rotatably hold the ball in cooperation with tips of the first protruding parts. The first protruding parts are each provided with an extension part that extends out sideways. An outer surface of the extension part is provided with an engagement part that engages with an edge part of the opening. The first protruding parts and the second protruding parts are each capable of deforming to bend in a radial direction with respect to the axis, and tips of the second protruding parts are positioned more in the insertion direction than edge parts of the extension part on a side of the insertion direction.

10 Claims, 11 Drawing Sheets

(58) Field of Classification Search
CPC ............... F16C 11/106; F16C 2326/01; Y10T 403/32565; Y10T 403/32573; Y10T 403/32631; Y10T 403/32737; F60Q 1/06; F60Q 1/068; F60Q 1/78; B60Q 2200/32; B60Q 1/06; B60Q 1/068; B60Q 1/78
See application file for complete search history.

(56) References Cited

U.S. PATENT DOCUMENTS

| | | | | |
|---|---|---|---|---|
| 5,653,548 | A * | 8/1997 | Amdahl | F16C 11/0657 403/329 |
| 6,209,175 | B1 * | 4/2001 | Gershenson | F16B 5/065 411/509 |
| 6,247,868 | B1 * | 6/2001 | Burton | F16C 11/0628 403/135 |
| 6,692,176 | B1 * | 2/2004 | Fladhammer | F16C 11/0695 403/135 |
| 6,758,622 | B2 * | 7/2004 | Burton | F16C 11/069 403/7 |
| 6,837,716 | B1 | 1/2005 | Brazas | |
| 7,056,125 | B2 * | 6/2006 | Melis | F16C 11/0638 439/8 |
| 7,396,183 | B2 * | 7/2008 | Dona Contero | F16C 1/14 403/329 |
| 7,686,530 | B2 * | 3/2010 | Schilz | F16C 11/069 403/329 |
| 7,963,715 | B2 * | 6/2011 | Burton | F16C 11/0657 403/135 |
| 9,140,294 | B2 * | 9/2015 | Burton | F16C 11/069 |
| 9,445,512 | B2 * | 9/2016 | Wang | F16M 13/022 |
| 9,995,331 | B2 * | 6/2018 | Heimann | F16C 11/069 |
| 10,093,221 | B2 * | 10/2018 | Burton | B60Q 1/0483 |
| 10,570,942 | B2 * | 2/2020 | Metten | F16C 11/0657 |
| 11,149,785 | B2 * | 10/2021 | Fladhammer | F16C 11/0623 |
| 11,635,184 | B2 * | 4/2023 | Fladhammer | F16C 11/069 403/122 |
| 12,179,713 | B2 * | 12/2024 | Renoux | F16C 11/06 |
| 2007/0031185 | A1 * | 2/2007 | Bertram | F16B 21/075 403/122 |
| 2009/0257819 | A1 | 10/2009 | Burton | |
| 2019/0368535 | A1 | 12/2019 | Recker | |
| 2022/0333637 | A1 * | 10/2022 | Jakobsmeyer | F16C 11/106 |
| 2022/0349441 | A1 * | 11/2022 | Japs | F16C 11/0695 |

FOREIGN PATENT DOCUMENTS

| | | | | |
|---|---|---|---|---|
| EP | 3346148 A1 * | 7/2018 | | B60Q 1/06 |
| FR | 2900206 A1 * | 10/2007 | | B01D 53/002 |
| JP | S56135514 U | 10/1981 | | |
| WO | WO-2011096372 A1 * | 8/2011 | | B60Q 1/06 |

* cited by examiner

BALL JOINT

CROSS-REFERENCE TO RELATED APPLICATIONS

This application is a U.S. National Phase Application of PCT/JP2021/017914, filed on May 11, 2021, which claims the benefit of priority to Japanese Patent Application No. 2020-102230, filed Jun. 12, 2020. The contents of these applications are hereby expressly incorporated by reference in their entirety.

TECHNICAL FIELD

The present invention relates to a ball joint for mounting a ball stud to a panel.

BACKGROUND ART

There is known an automobile headlamp assembly including a ball socket fixed to a hole provided in an anchor panel and a ball stud rotatably supported by the ball socket (for example, Patent Document 1). The ball socket of Patent Document 1 includes an annular ring and multiple arches spanning the ring on one side thereof to jointly constitute a basket. The ball stud has a shaft and a ball provided at an end of the shaft and accommodated in the basket. Each arch includes an outward protrusion that engages with the anchor panel and a locking piece that protrudes toward the inside of the basket and restricts the movement of the ball.

PRIOR ART DOCUMENT(S)

Patent Document(s)

[Patent Document 1] U.S. Pat. No. 6,837,716B1

SUMMARY OF THE INVENTION

Task to be Accomplished by the Invention

To improve the work efficiency of assembling the headlamp or the like to the automobile, it is desired that the ball socket with the ball stud pre-mounted therein can be mounted to the panel. However, in the ball socket of Patent Document 1, movement of the locking pieces in the basket toward the inside of the basket is obstructed by the ball. Therefore, there is a problem that when an attempt is made to mount the ball socket with the ball stud pre-mounted therein to the anchor panel, it is difficult for the arches to bend toward the inside of the basket and it is not easy to mount the ball socket.

In view of the foregoing background, an object of the present invention is to provide a ball joint which is easily mounted to the panel with the ball stud mounted therein.

Means to Accomplish the Task

To achieve the above object, one aspect of the present invention provides a ball joint (1, 101) comprising a ball stud (8) and a socket (10) for rotatably mounting a ball (9) of the ball stud in an opening of a panel (5), the socket comprising: a base portion (12) that is annular about an axis extending in an insertion direction; multiple first protruding parts (13) that each protrude from the base portion in the insertion direction and are joined to each other at tips thereof; and second protruding parts (14, 34) that protrude from the base portion in the insertion direction or from extension ends of the first protruding parts in a direction opposite to the insertion direction, in positions between the first protruding parts, wherein the second protruding parts rotatably hold the ball in cooperation with the tips of the first protruding parts, the first protruding parts are each provided with an extension part (18) that extends out sideways with respect to a protruding direction, an outer surface of the extension part is provided with an engagement part (15) that engages with an edge part of the opening, the first protruding parts and the second protruding parts are each capable of deforming to bend in a radial direction with respect to the axis, and tips of the second protruding parts are positioned more in the insertion direction than side edges of the extension parts on a side of the insertion direction.

According to this aspect, the first protruding parts each provided with an engagement part for engaging with the opening of the panel and the second protruding parts for holding the ball of the ball stud are each capable of deforming to bend relative to the base portion. Therefore, when mounting the ball joint to the panel, even though the first protruding parts are pressed against the edge part of the opening and bend in a direction toward the axis, the second protruding parts can be prevented from bending in the radial direction of the axis or toward the ball. This prevents receiving resistance from the holding parts when mounting the ball joint. Thus, the insertion force required to mount the ball joint can be reduced, whereby it becomes easy to mount the ball joint to the panel.

Also, an engagement part is provided on the extension part which extends out sideways. Thereby, the engagement part can be made larger in the circumferential direction with respect to the axis, and therefore, the ball joint and the panel can engage with each other more firmly.

Further, since the tips of the second protruding parts are positioned more in the insertion direction than the side edges of the extension parts on the side of the insertion direction, the surfaces of the second protruding parts that face outward in the radial direction come into contact with the opening of the panel earlier than the extension parts do when mounting the ball joint. As a result, when the engagement parts engage with the panel, the second protruding parts and the extension parts are already in contact with the edge part of the opening, and the load applied to the ball joint at the time of engagement is dispersed to the second protruding parts and the extension parts. Therefore, compared to the case where the load is applied to only the extension parts, the resistive force that the worker receives at the time of assembly can be made difficult to change, and a smooth assembly work without discomfort is allowed.

In the above aspect, preferably, when the ball joint is mounted in the opening of the panel, the panel is positioned between the engagement parts and the base portion and is sandwiched by the engagement parts and the base portion.

According to this aspect, since the assembly of the ball joint to the panel is completed by inserting the ball joint until the panel reaches between the engagement parts and the base portion, the ball joint can be easily assembled to the panel.

In the above aspect, preferably, each extension part forms a cantilever, and the engagement part is provided on a free end of the extension part.

According to this aspect, the extension parts bend toward the inside of the basket when mounting the ball joint, and therefore, the insertion force required for mounting the ball joint can be further reduced.

In the above aspect, preferably, each extension part has a plate-like shape having surfaces facing in the radial direction.

According to this aspect, the extension parts become easy to bend inward in the radial direction.

In the above aspect, preferably, the base portion is provided with access passages (30, 103) which penetrate in the radial direction in positions aligned with the extension parts and overlap with the extension parts in the radial direction.

According to this aspect, it is possible to remove the ball joint from the panel by pushing in the extension parts radially inward via the access passages and thereby causing the extension parts to bend. Therefore, the removal workability is improved.

In the above aspect, preferably, the base portion is provided with notches (19) in positions aligned with the extension parts, each notch being recessed in a direction opposite to the insertion direction, and at least a part of each extension part overlaps with the notch in the radial direction.

According to this aspect, the access passages overlapping with the extension parts in the radial direction can be provided in the base portion.

In the above aspect, preferably, the base portion is provided with access holes (102) in positions aligned with the extension parts, each access hole penetrating the base portion in the radial direction, and at least a part of each extension part overlaps with the access hole in the radial direction.

According to this aspect, the access passages overlapping with the extension parts in the radial direction can be provided in the base portion.

In the above aspect, preferably, the second protruding parts protrude from the base portion in the insertion direction, and a plate-shaped inner reinforcement piece (21) having surfaces facing in the radial direction is provided at an inner edge of a base end portion of each second protruding part.

According to this aspect, the abrasion resistance of the second protruding parts against the stud can be improved, and the bending stiffness of the second protruding parts can be enhanced.

In the above aspect, preferably, a plate-shaped outer reinforcement piece (22) having surfaces facing in the radial direction is provided at an outer edge of the base end portion of each second protruding part.

According to this aspect, the bending stiffness of the second protruding parts can be enhanced, and the abrasion resistance of the second protruding parts against the edge part of the opening of the panel can be enhanced.

In the above aspect, preferably, a surface of each second protruding part that faces outward in the radial direction is substantially parallel to the insertion direction.

According to this aspect, the second protruding parts become less likely to obstruct the insertion of the ball joint into the opening of the panel, whereby the ball joint can be mounted to the panel easily.

In the above aspect, preferably, when the ball joint is mounted in the opening of the panel, the surface of each second protruding part that faces outward in the radial direction resiliently contacts the edge part defining the opening.

According to this aspect, the second protruding parts are prevented from deforming to bend in the radial direction of the axis after the ball joint is mounted to the panel. Therefore, the holding performance of the ball stud of the ball joint after the ball joint is mounted to the panel can be improved.

Effect of the Invention

According to the foregoing configuration, a ball joint which is easily mounted to the panel with the ball stud mounted therein can be provided.

MODE(S) FOR CARRYING OUT THE INVENTION

In the following, a ball joint according to the present invention will be described with reference to the drawings.

First Embodiment

Figure 1:
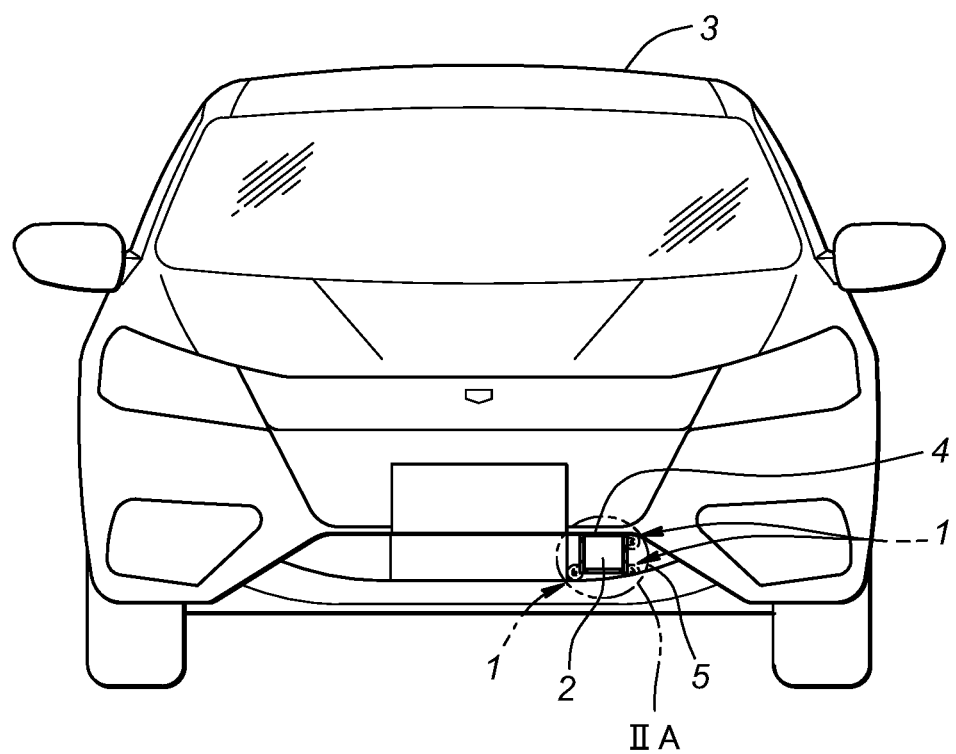
FIG. 1 is a schematic diagram of a vehicle to which a millimeter-wave radar device is mounted by an adapter frame provided with a ball joint according to the present invention.

As shown in FIG. 1, ball joints 1 according to the first embodiment are used to mount an adapter frame 4 supporting a millimeter-wave radar device 2 to a panel 5 provided on a front face of a vehicle body 3. In the following, for convenience of explanation, description will be made based on a posture in a state mounted to the vehicle body 3.

Figure 2:
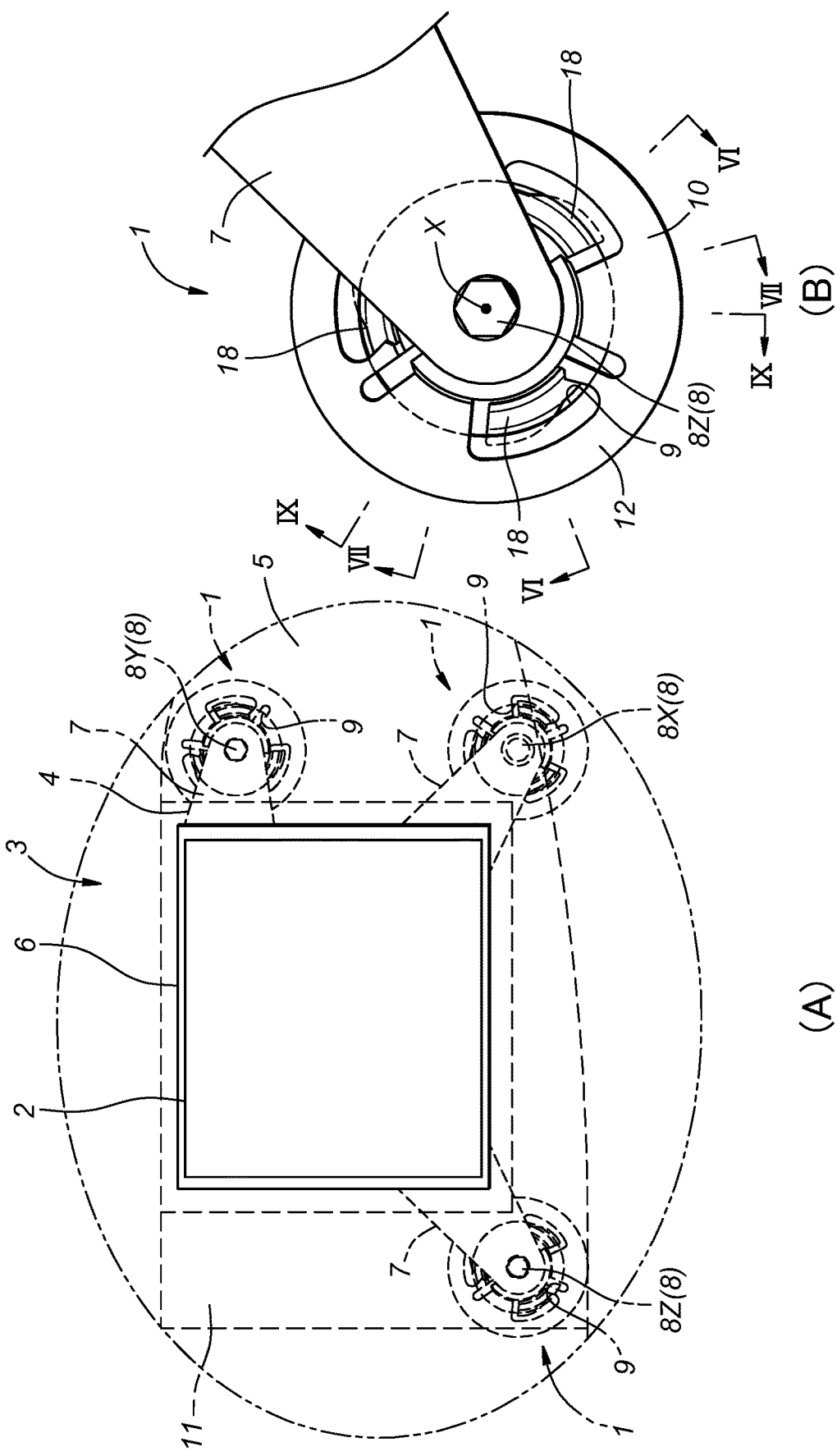
FIG. 2 is (A) an enlarged view of a part IIA in FIG. 1, and, (B) an enlarged view of a part JIB in FIG. 2(A)

As shown in FIG. 2(A), the adapter frame 4 is provided with a substantially flat plate-shaped base plate 6 facing in the front-rear direction and three leg parts 7 which extend in mutually different directions along an in-plane direction of the base plate 6.

Figure 3:
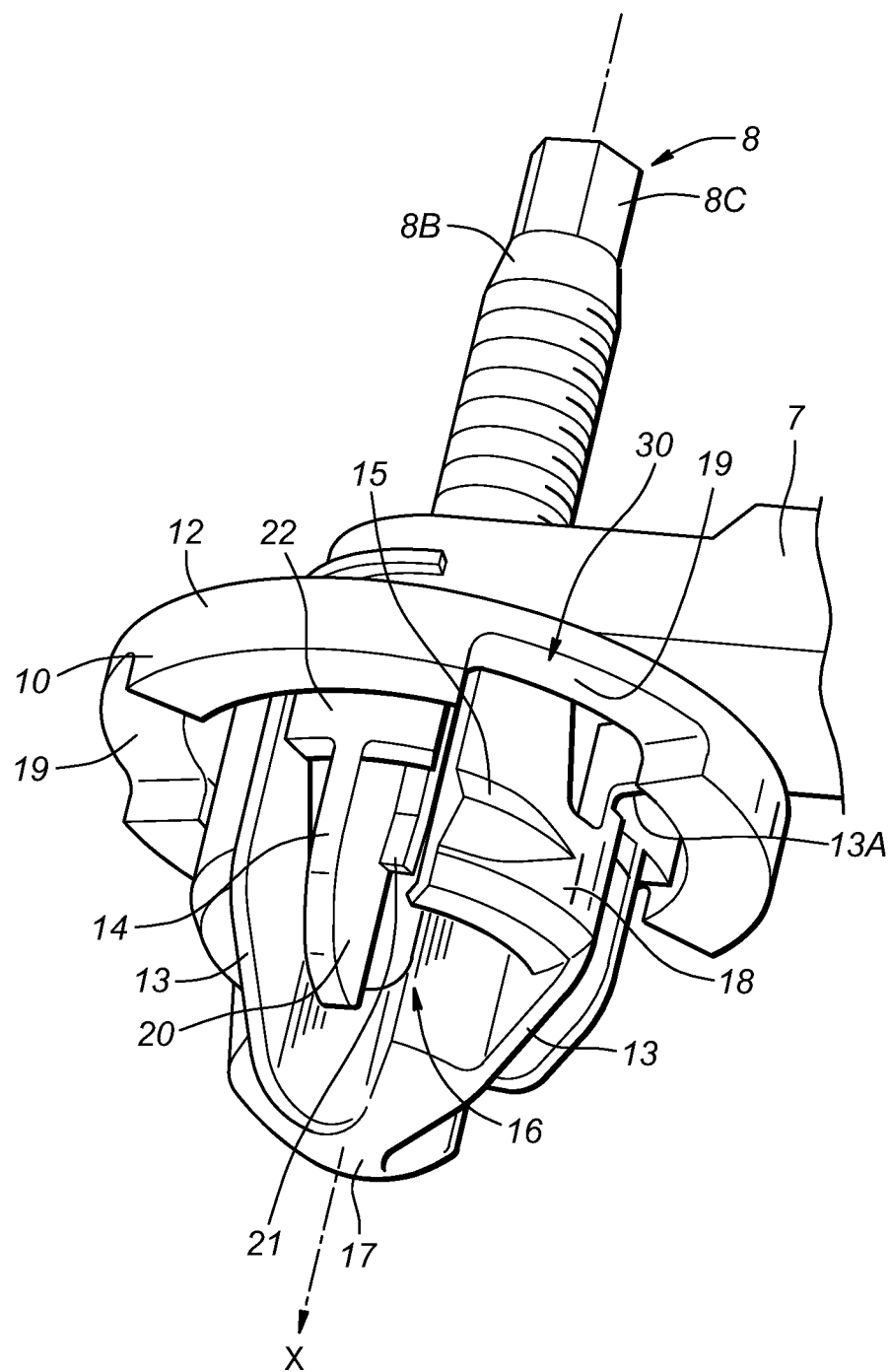
FIG. 3 is a partial perspective view of the adapter frame provided with the ball joint.

The millimeter-wave radar device 2 is accommodated in a casing having a substantially rectangular parallelepiped shape and is fixed to the base plate 6. The leg parts 7 are each provided with a ball stud 8. As shown in FIG. 3, the ball studs 8 each include a round rod-shaped shaft 8B and a ball 8A (metal ball) joined to the tip thereof. The shaft 8B of each ball stud 8 is provided with a male thread. The leg parts 7 are provided with respective threaded holes to be substantially perpendicular to the main surface to the base plate 6

(namely, to extend in the fore and aft direction), and the ball studs 8 are threadedly engaged with the respective threaded holes. The ball 8A may be a sphere and may be provided, on a tip end surface thereof, with a recess that is recessed toward the shaft 8B. Of the three ball studs 8, two ball studs 8 are respectively positioned above (hereinafter, the ball stud 8 provided in this position will be referred to as a vertical adjustment bolt 8Y) and to the lateral side of (to the left in front view; hereinafter the ball stud 8 provided in this position will be referred to as a horizontal adjustment bolt 8Z) one ball stud 8 (hereinafter referred to as a reference bolt 8X).

Figure 8:
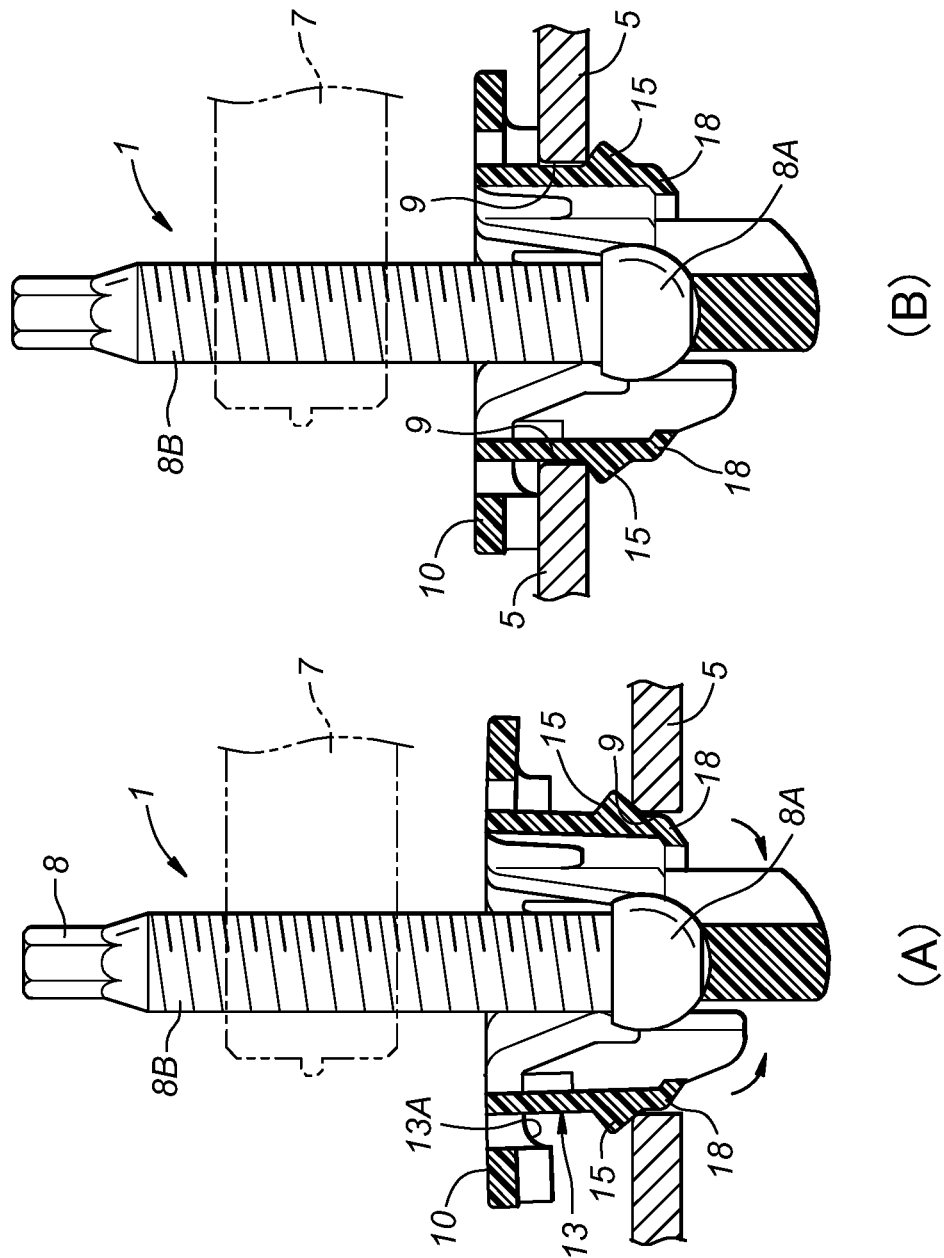
FIG. 8 is a sectional view (VI-VI sectional view) for explaining deformation (A) during assembly of the ball joint to the panel and (B) after assembly.
Figure 9:
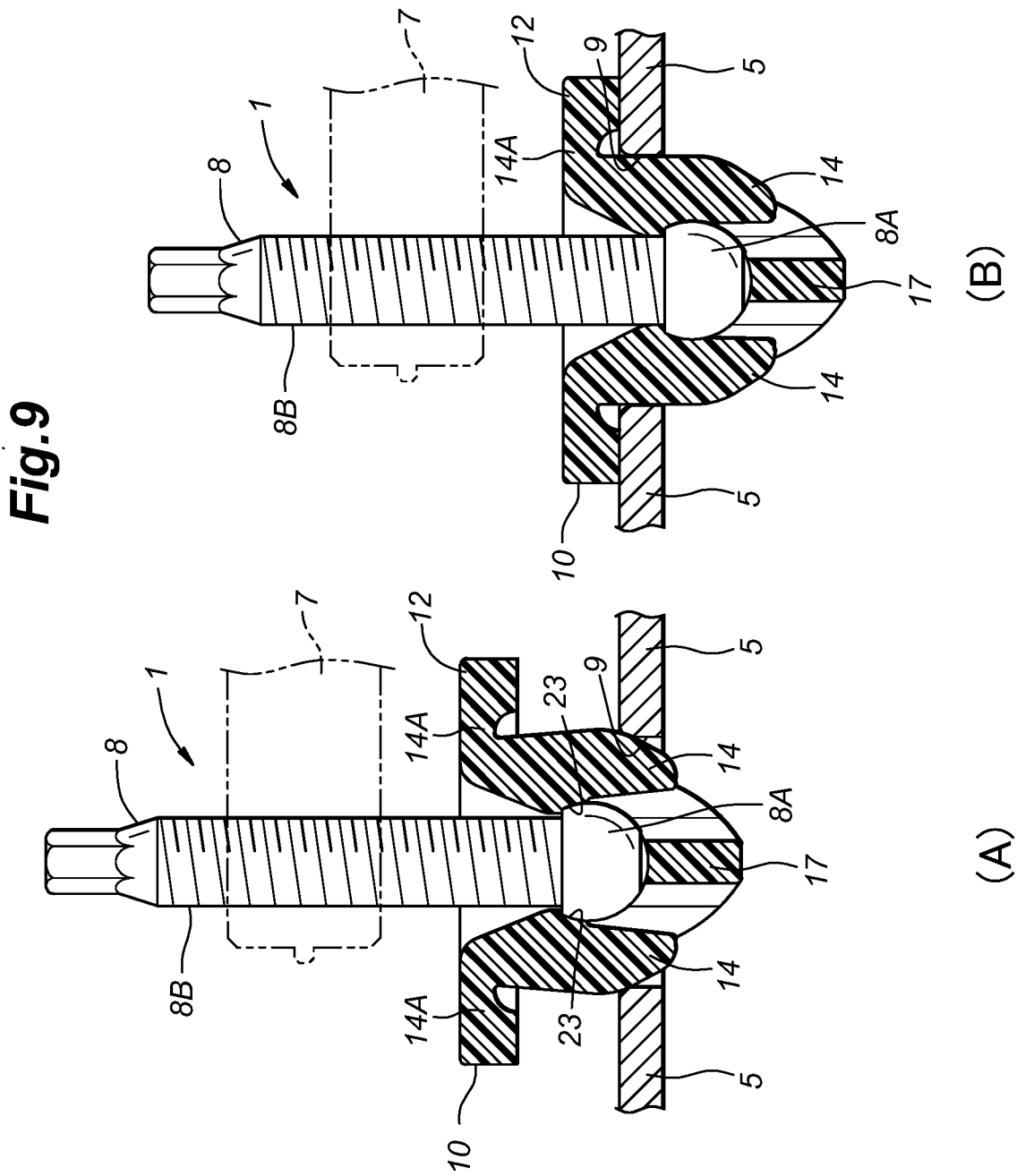
FIG. 9 is a sectional view (IX-IX sectional view) for explaining deformation (A) during assembly of the ball joint to the panel and (B) after assembly.

As shown in FIG. 2(A), the panel 5 is provided with three through holes 9 (openings; see FIG. 8(A) for more details). Of the three through holes 9, two through holes 9 are respectively positioned above and to the lateral side (to the left in front view in FIG. 2(A)) of one through hole 9. A socket 10 is fitted in each of the through holes 9 from front to rear and is fixed therein. With each ball stud 8 inserted into the corresponding socket 10, the ball joint 1 is configured and the adapter frame 4 is joined to the panel 5. At this time, the ball stud 8 (more specifically, the ball 8A) is supported by the socket 10 to be rotatable in an arbitrary direction. As shown in FIG. 1, in the present embodiment, the vehicle body 3 is provided with a cover 11 that covers a part of the adapter frame 4 surrounding the millimeter-wave radar device 2 from front.

By threadedly advancing and retracting the vertical adjustment bolt 8Y, it is possible to cause the base plate 6 to rotate about an axis extending in the up-down direction to adjust the inclination of the millimeter-wave radar device 2 in the vertical direction. Also, by threadedly advancing and retracting the horizontal adjustment bolt 8Z, it is possible to cause the base plate 6 to rotate about an axis extending in the left-right direction to adjust the inclination of the millimeter-wave radar device 2 in the horizontal direction. In the present embodiment, as shown in FIG. 3, an end portion of the shaft 8B of the vertical adjustment bolt 8Y and an end portion of the shaft 8B of the horizontal adjustment bolt 8Z are each provided with a hexagonal columnar operation part 8C to facilitate rotation operation using a tool.

Next, details of the ball joint 1, particularly, the socket 10, will be described with reference to FIGS. 3 to 9.

As shown in FIGS. 2(B) and 3, the socket 10 has a substantially semi-ellipsoidal shape that is rotationally symmetrical about an axis X extending along an insertion direction (more specifically, the direction of insertion of the ball joint 1 into the panel 5). In the following description, a direction orthogonal to the axis X may be referred to as a radial direction, a rotation direction about the axis X may be referred to as a circumferential direction, a direction orthogonal to the axis X and away from the axis X may be referred to as an outward direction, and a direction orthogonal to the axis X and toward the axis X may be referred to as an inward direction, as necessary.

Figure 4:
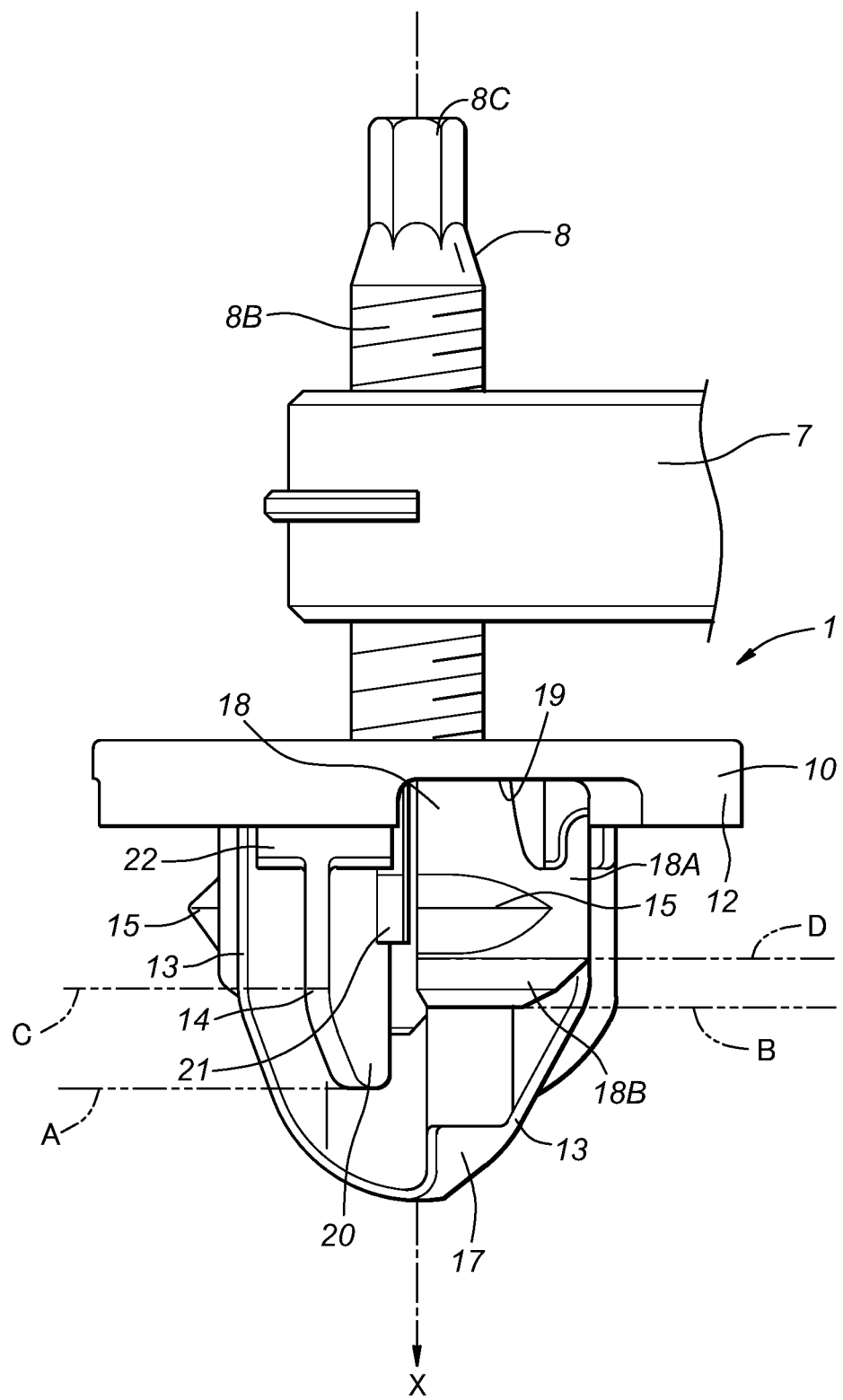
FIG. 4 is a partial side view of the adapter frame provided with the ball joint.
Figure 5:
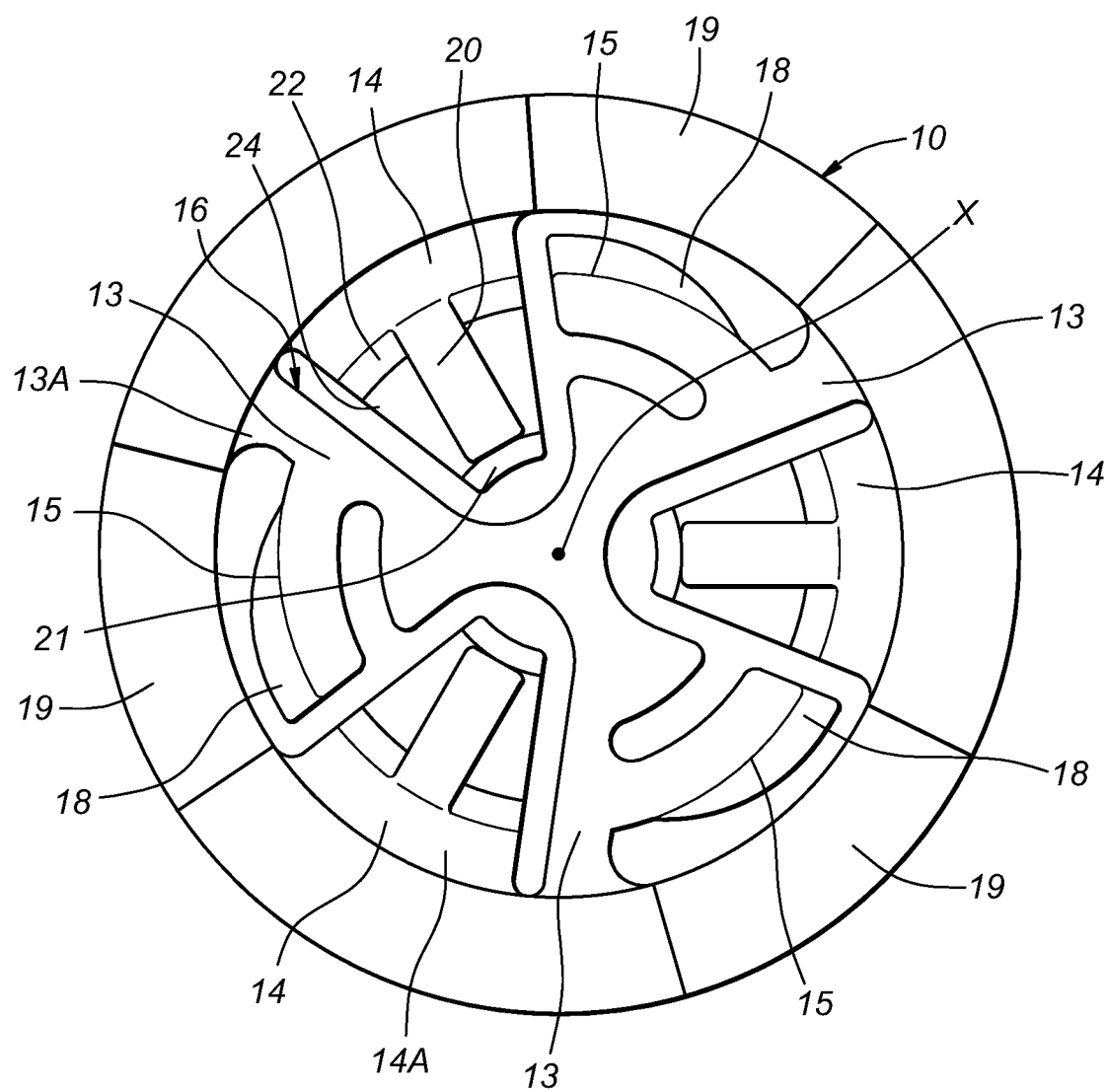
FIG. 5 is a rear view of a socket of the ball joint according to the present invention.

As shown in FIGS. 3 to 5, the socket 10 includes an annular (ring-shaped) base portion 12, multiple arches 13 (first protruding parts) extending out rearward (in the insertion direction) and are joined to each other at extension ends, holding parts 14 (second protruding parts) protruding rearward from the base portion 12 in positions between the arches 13, and locking claws 15 (engagement parts) provided on the respective arches 13.

As shown in FIG. 5, the base portion 12 has a shape of a circular annular plate having a center on the axis X. As shown in FIG. 3, the arches 13 are each joined to the rear surface of the base portion 12, protrude rearward, and then extend in a gently curved manner toward the axis X to be joined to each other at the tips thereof. The socket 10 has a basket 16 formed by the arches 13 and the base portion 12, where the basket 16 has a semi-ellipsoidal cage-like shape cut in the short axis direction. In other words, the tips of the arches 13 are connected to each other to constitute a bottom portion 17 of the basket 16. In the present embodiment, the base ends of the arches 13 are arranged at equal intervals in the circumferential direction, and the tip of each arch 13, namely, the bottom portion 17 of the basket 16 is positioned on the axis X. In the present embodiment, the ball joint 1 is provided with three arches 13.

As shown in FIGS. 3 and 4, each arch 13 is provided with an extension part 18 that extends sideways with respect to the protruding direction, namely, in the lateral direction. Each extension part 18 has a plate-like shape having surfaces facing in the radial direction. The extension part 18 is joined to the arch 13 at one end in the circumferential direction (hereinafter, the base end) to form a cantilever shape. Therefore, when a load directed to a radially inner side (inward) is applied to the other end in the circumferential direction (hereinafter, the free end), the extension parts 18 each undergo deformation to bend radially inward (namely, toward the axis X). When the load is released, the extension parts 18 spread radially outward (namely, in the direction away from the axis X) to return to the original position. In the present embodiment, as shown in FIG. 5, each extension part 18 extends out from the arch 13 in the anticlockwise (counterclockwise) direction as seen from rear, and extends toward the base portion 12 and toward the bottom portion 17. As shown in FIG. 3, the extension parts 18 cooperate with the base portion 12 and the arches 13 to form the semi-ellipsoidal cage-like outer shape of the ball joint 1.

Figure 6:
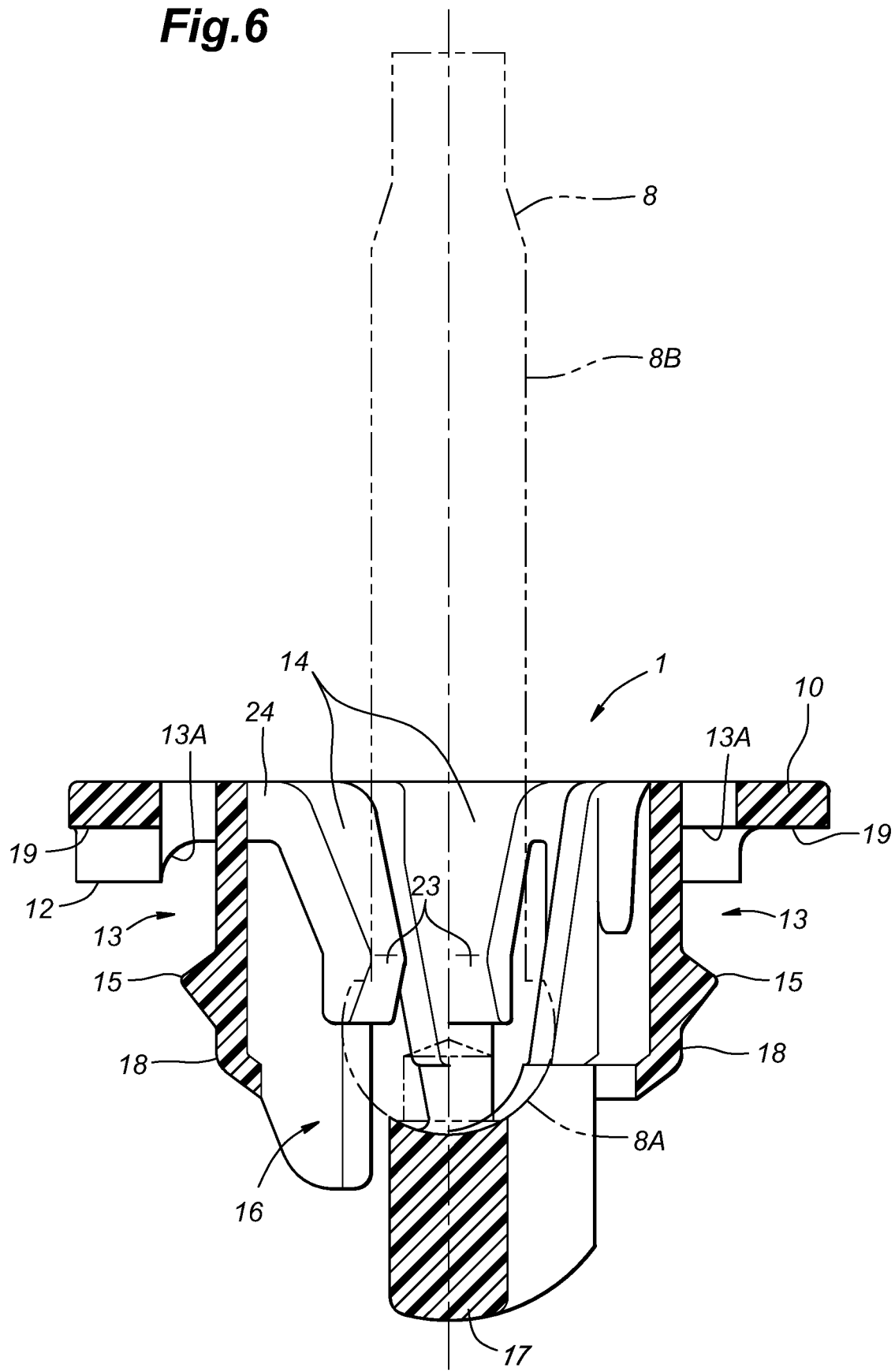
FIG. 6 is a sectional view taken along line VI-VI in FIG. 2(B)

As shown in FIGS. 3 and 6, the locking claws 15 (engagement parts) are provided respectively on the outer surfaces (surfaces facing radially outward) of the free ends of the extension parts 18. Each locking claw 15 has a claw shape protruding radially outward from the outer surface of the free end of the extension part 18. It is preferred that the locking claw 15 is provided as close to an edge of the free end of the extension part 18 as possible, and in the present embodiment, the locking claw 15 extends from the extension end (free end) toward the base end and reaches approximately the center of the extension part 18. Note that the present invention is not limited to this embodiment, and the locking claw 15 may be provided so that at least a part thereof overlaps with the extension part 18. The range in which the locking claw 15 is provided may be changed according to the flexibility of the extension part 18.

As shown in FIG. 4, the tip of the holding part 14 (see the two-dot chain line A in FIG. 4) is positioned more forward in the insertion direction than a side edge (see the two-dot chain line B in FIG. 4) of the extension part 18 on the front side in the insertion direction (the direction indicated by the arrow of X in FIG. 4 or downward in the sheet plane). In the present embodiment, the holding part 14 has a substantially trapezoidal shape having a pair of parallel sides on radially outer and inner sides, as seen in the circumferential direction. The extension part 18 has an outer surface 18A that faces radially outward and an extension surface 18B that extends radially inward from the front side edge of the surface in the insertion direction. The insertion direction-side edge (see the two-dot chain line C in FIG. 4) of the radially outer surface of the holding part 14 is positioned more forward in the insertion direction than the front side edge (see the two-dot chain line D in FIG. 4) of the outer surface 18A in the insertion direction.

As shown in FIG. 8(A), when the ball joint 1 is mounted in the through hole 9 of the panel 5, an inward directed load is applied to the extension parts 18 which accordingly bend radially inward, and the locking claws 15 move inward. When the front surface of the panel 5 comes into contact with the rear surface of the base portion 12, as shown in FIG. 8(B), the locking claws 15 resiliently move radially outward to engage with the edge part of the through hole 9. Once the mounting of the ball joint 1 is completed, the panel 5 is positioned between the locking claws 15 and the base portion 12, and the panel 5 is sandwiched between the locking claws 15 and the base portion 12. Thereby, the base portion 12 restricts the rearward movement of the ball joint 1 relative to the panel 5, and the locking claws 15 restrict the forward movement of the ball joint 1 relative to the panel 5. Also, the movement of the ball joint 1 is restricted in the up-down and left-right directions by the opening edge of the panel 5, and the ball joint 1 is locked to the panel 5.

As shown in FIGS. 3 and 4, the base portion 12 is provided with notches 19 in positions aligned with the respective extension parts 18 in the front-rear direction such that each notch 19 is recessed forward (namely, in the direction opposite to the insertion direction). In the present embodiment, as shown in FIG. 4, the notches 19 each have a substantially rectangular shape as seen in the radial direction, and the front edge part of each extension part 18 overlaps with the corresponding notch 19 in the radial direction. Thereby, it is possible to access the extension part 18 via the notch 19 after the ball joint 1 is mounted to the panel 5.

In other words, the notches 19 define access passages 30 in the base portion 12 to allow access to the extension parts 18. The access passages 30 defined by the notches 19 penetrate in the radial direction in positions aligned with the extension parts 18 and overlap the extension parts 18 in the radial direction. Due to the access passages 30, it is possible to insert prescribed a tool via the notches 19 to push out the extension parts 18 radially inward and to make the extension parts 18 undergo bending deformation. As a result of this deformation, the engagement between the locking claws 15 and the panel 5 is released, and the ball joint 1 (more specifically, the socket 10) can be removed easily from the panel 5.

As shown in FIG. 3, the holding parts 14 protrude rearward (in the insertion direction) from the rear surface of the base portion 12 between adjacent arches 13. In the present embodiment, the socket 10 is provided with three holding parts 14 each provided between adjacent arches 13.

As shown in FIGS. 3 and 5, the holding parts 14 each include a holding part main body 20 that protrudes rearward (in the insertion direction) from the rear surface of the base portion 12, an inner reinforcement piece 21 provided on the radially inner side of the holding part main body 20, and an outer reinforcement piece 22 provided on the radially outer side of the holding part main body 20.

The holding part main body 20 has a plate-like shape having surfaces facing in the circumferential direction and protruding rearward from the rear surface of the base portion 12.

The inner reinforcement pieces 21 and the outer reinforcement pieces 22 each have a plate-like shape having surfaces facing in the radial direction. Each of the outer reinforcement pieces 22 has a substantially rectangular shape extending in the circumferential direction as seen in the radial direction and is joined to an outer base end portion of the holding part main body 20 to define a radially outer surface of the base end portion of the holding part 14. Each of the inner reinforcement pieces 21 has a substantially rectangular shape extending from the inner base end of the holding part main body 20 to approximately the center of the holding part main body 20 in the front-rear direction and is joined to the inner base end portion of the holding part main body 20. As a result of the provision of the inner reinforcement piece 21 and the outer reinforcement piece 22, the base end portion of the holding part 14 has an H-shaped cross section. This enhances the stiffness of the base end portion of the holding part 14.

Figure 7:
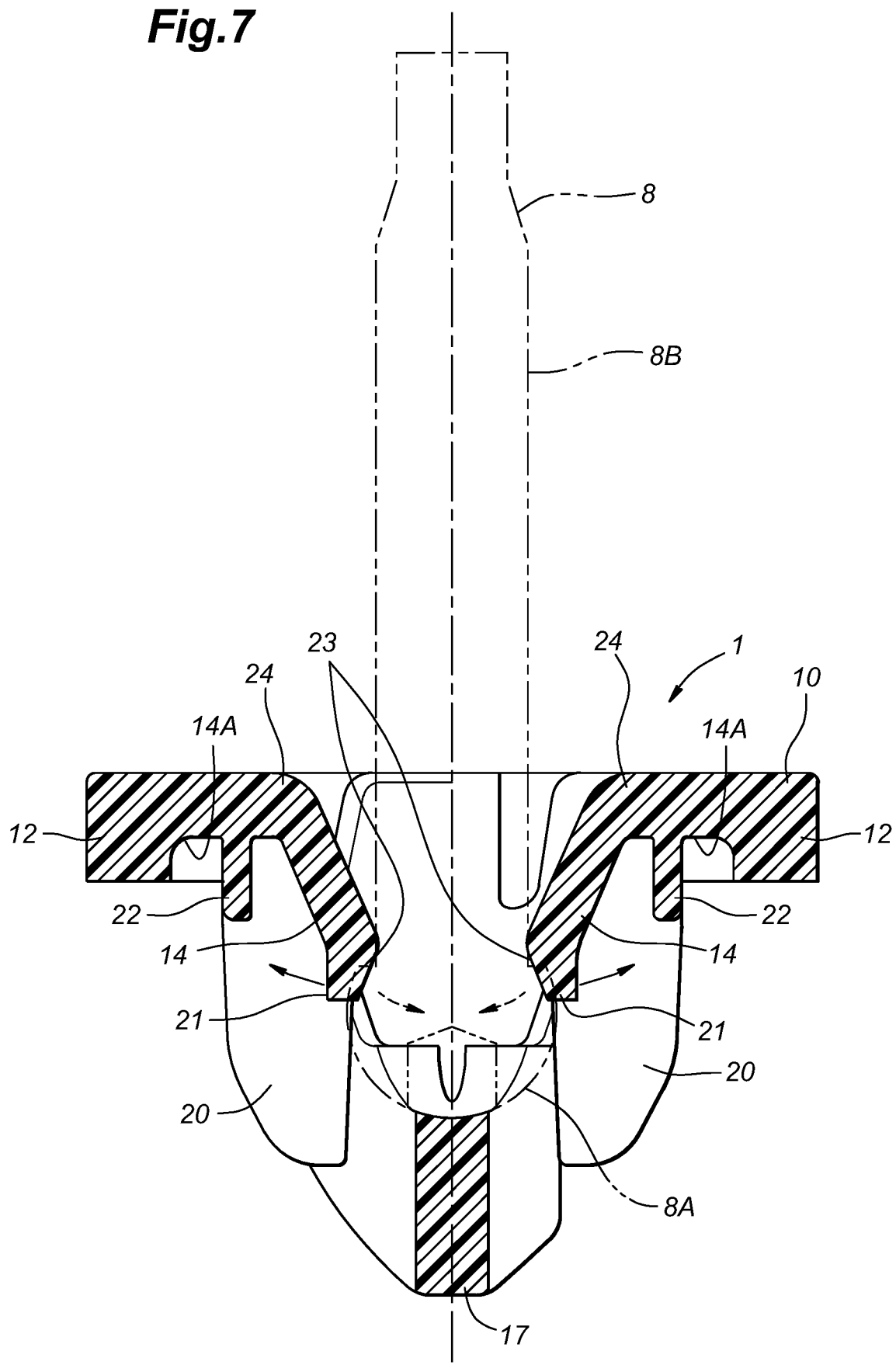
FIG. 7 is a sectional view taken along line VII-VII in FIG. 2(B)

As shown in FIG. 7, the surface of each outer reinforcement piece 22 that faces outward in the radial direction, namely, the radially outward facing surface of each holding part 14 is substantially parallel to the insertion direction (rearward direction) before the insertion of the ball 8A. Therefore, the outer reinforcement pieces 22 also form the semi-ellipsoidal cage-like outer shape of the socket 10 in cooperation with the extension parts 18, the base portion 12, and the arches 13. The radially outward facing surface of the outer reinforcement piece 22 is substantially parallel to the insertion direction but preferably is slightly inclined radially outward toward rear at least when the ball 8A is inserted and the socket 10 is not mounted to the panel 5. Note that the radially outward facing surface of the outer reinforcement piece 22 may be slightly inclined radially outward toward rear beforehand prior to insertion of the ball 8A or may deform to be slightly inclined radially outward toward rear upon insertion of the ball 8A.

On the radially inner side of each holding part 14, a receiving part 23, which is a surface inclined radially outward toward rear, is provided. In the present embodiment, the receiving part 23 is formed by cutting off the front end of the inner reinforcement piece 21 radially outward.

Further, the inner reinforcement piece 21 and the outer reinforcement piece 22 are connected by a wall-shaped connection part 24 extending along the front edge of the holding part main body 20. This enhances the stiffness of the holding part 14.

When applied a predetermined load radially outward at the time of insertion of the ball 8A, for example, the holding parts 14 deform to bend radially outward (namely, in the direction away from the axis X) at the tips thereof so that the receiving parts 23 are opened radially outward (see the solid line arrows in FIG. 7). When the load is removed, the holding parts 14 return to the original shape and the receiving parts 23 are closed radially inward (see the broken line arrows in FIG. 7).

As shown in FIGS. 7 and 9(A), the ball 8A of the ball stud 8 is accommodated in the basket 16, with the ball 8A supported by the receiving parts 23 from front and the front portion of the ball 8A received by the receiving parts 23. In this state, the receiving parts 23 contact the side surface of the front portion of the ball 8A and the forward and radially rearward movement of the ball 8A is restricted. Further, the rear surface of the ball 8A contacts the bottom portion 17 of the basket 16, and the rearward movement is restricted by the bottom portion 17. Thereby, the ball 8A is rotatably held in the basket 16 by cooperation of the receiving parts 23 and the bottom portion 17 of the basket 16.

Further, when the ball stud 8 is mounted in the through hole 9 of the panel 5, the radially outward facing surface of each holding part 14, namely, the outer surface of each outer reinforcement piece 22, is pushed radially inward by the edge part defining the through hole 9 to be parallel to the insertion direction (rearward direction), as shown in FIG.

9(B). As a result, each holding part 14 for the ball stud 8 resiliently contacts the edge part defining the through hole 9 at the radially outward facing surface.

In the present embodiment, the connection part (namely, the base end) of each arch 13 to the base portion 12 is provided with an easily deformable part 13A that is easier to deform than the other part. The easily deformable part 13A is preferably formed by reducing the cross section than the cross section of the other part of the base portion 12 and the arch 13. The provision of the easily deformable part 13A allows the tip portion of the arch 13 to easily deform radially inward and outward. Similarly, the connection part (namely, the base end) of each holding part 14 to the base portion 12 also is provided with an easily deformable part 14A that is easier to deform than the other part. The easily deformable part 14A is preferably formed by reducing the cross section than the cross section of the other part of the base portion 12 and the holding part 14. The provision of the easily deformable part 14A allows the tip portion of the holding part 14 to easily deform radially inward and outward.

Next, the effects of the ball joint 1 thus configured will be described.

To improve the mounting workability of the millimeter-wave radar device 2, it may be conceived to mount the ball joint 1 in the through hole 9 of the panel 5 with the ball stud 8 joined to the socket 10. When mounting the ball joint 1 in the through hole 9 of the panel 5, it is necessary to deform the arches 13 so that the locking claws 15 pass the through hole 9.

In the present invention, the arches 13 and the holding parts 14 each protrude from the base portion 12 and are capable of deforming radially inward relative to the base portion 12 independently to each other. Therefore, when the arches 13 deform such that the locking claws 15 move radially inward, the holding parts 14 are prevented from bending radially inward. This prevents receiving resistance the holding part 14 when mounting the ball joint 1. Thus, compared to the case where the receiving parts 23 are provided on the arches 13 and the ball 8A is received thereby, the insertion force required to mount the ball joint 1 can be reduced. Thereby, it becomes easy to mount the ball joint 1 to the panel 5, and the mounting workability of the millimeter-wave radar device 2 can be improved.

In the present embodiment, the locking claws 15 are provided on the free ends of the extension parts 18 which each form a cantilever shape. Therefore, when mounting the ball joint 1, it is possible to easily move the locking claws 15 to positions where the locking claws 15 can pass the through hole 9 by making the extension parts 18 bend inward of the basket 16. This can further reduce the insertion force required to mount the ball joint 1. Further, since each extension part 18 has a plate-like shape having surfaces facing in the radial direction, the extension parts 18 become easier to deform so as to bend inward of the basket 16.

Further, since each locking claw 15 is provided on the extension part 18, the locking claw 15 can be made longer in the radial direction compared to the case where the locking claw 15 is provided on only the arch 13. Thereby, it is possible to increase the size of the part where the ball joint 1 and the panel 5 engage with each other, and therefore, the ball joint 1 and the panel 5 can engage with each other more firmly.

The tips of the holding parts 14 are positioned more forward in the insertion direction than the front side edges of the extension parts 18 in the insertion direction. As a result, the radially outward facing surfaces of the holding parts 14 come into contact with the opening edge of the panel 5 earlier than the extension parts 18 do when mounting the ball joint. Since the locking claws 15 are provided on the extension parts 18, when the locking claws 15 contact and engage with the opening edge of the panel 5, both the holding parts 14 and the extension parts 18 are already in contact with the opening edge of the panel 5.

As a result, when the locking claws 15 engage with the opening edge of the panel 5, the load applied to the ball joint 1 is dispersed to the extension parts 18 and the holding parts 14. Therefore, compared to the case where the load is applied to only the extension parts 18, the resistive force that the worker receives at the time of assembly can be made difficult to change, and a smooth assembly work without discomfort is allowed.

Also, as shown in FIG. 9(A), the radially outward facing surface of each outer reinforcement piece 22 is substantially parallel to the insertion direction before mounting of the ball joint 1. As a result, the holding parts 14 become less likely to obstruct the insertion of the ball joint 1 into the opening of the panel 5, whereby the ball joint 1 can be mounted to the panel 5 easily.

Each holding part 14 is provided with the inner reinforcement piece 21 along the inner edge of the base end portion thereof. This enhances the bending stiffness of the holding part 14. Further, this protects the holding part 14 from the radially inner side, whereby the abrasion resistance of the holding part 14 against the ball stud 8 can be improved.

Each holding part 14 is provided with the outer reinforcement piece 22 along the outer edge of the base end portion thereof. This enhances the bending stiffness of the holding part 14. Further, this protects the holding part 14 from the radially outer side, whereby the abrasion resistance of the holding part 14 against the edge part of the opening of the panel 5 can be improved.

The radially outward facing surface of each holding part 14 resiliently contacts the edge part defining the through hole 9 of the panel 5. As a result, the holding parts 14 are difficult to spread in the radial direction after the ball joint 1 is mounted to the panel 5, and the radially outward bending deformation of the holding parts 14 is prevented. This makes it easier to maintain the contact between the side surface of the ball 8A and the holding parts 14 after the ball joint 1 is mounted to the panel 5, whereby the ball 8A is less easy to separate from the receiving parts 23. Thus, the holding performance of the ball stud 8 of the ball joint 1 can be improved.

Second Embodiment

Figure 10:
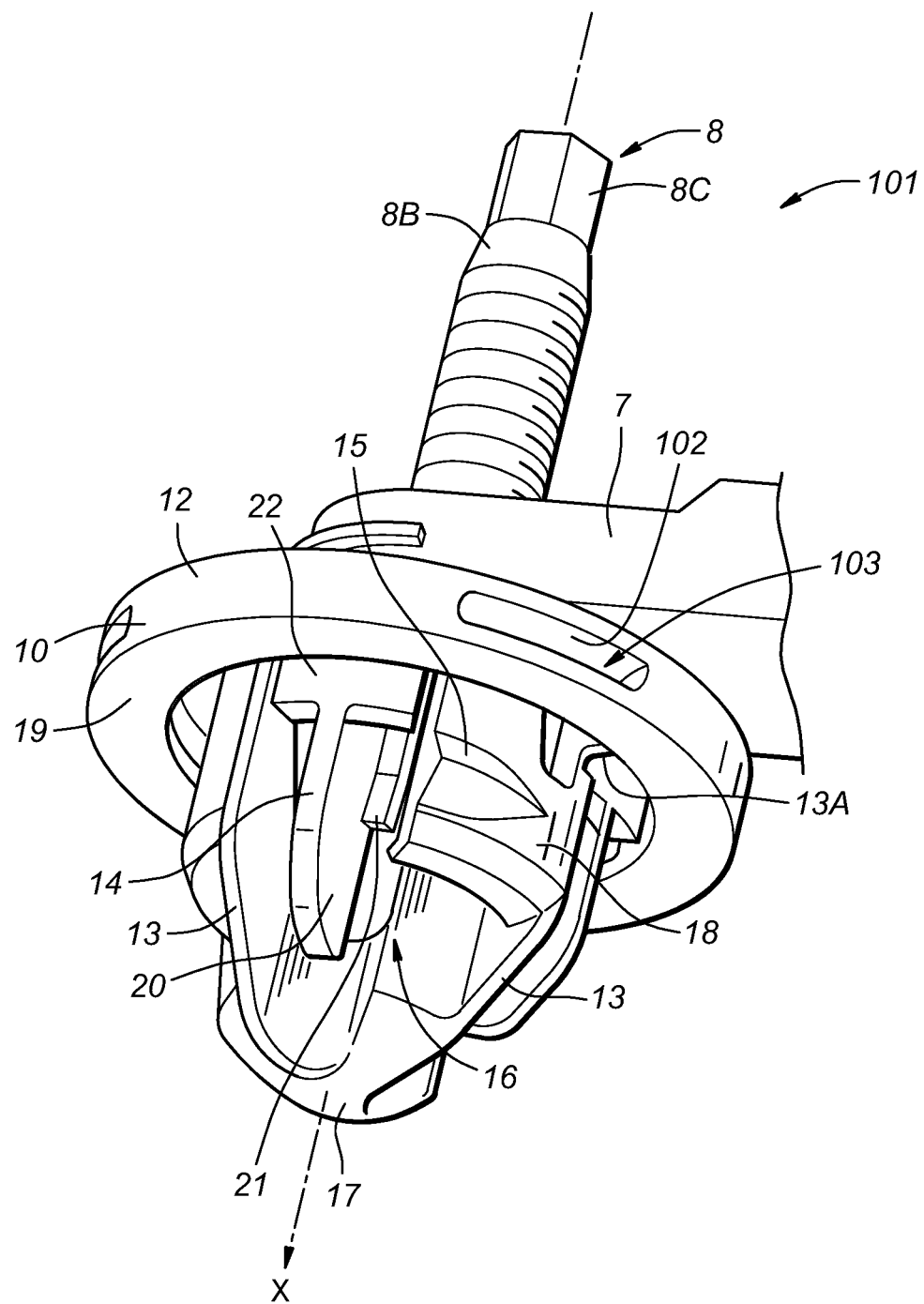
FIG. 10 is a partial perspective view of the adapter frame provided with a ball joint according to the second embodiment.

A ball joint 101 according to the second embodiment differs from the first embodiment in that, as shown in FIG. 10, the base portion 12 is provided with access holes 102 instead of the notches 19, and the other configuration is the same as that in the first embodiment and therefore description thereof will be omitted.

The access holes 102 are holes that penetrate the base portion 12 in the radial direction in positions aligned with the extension parts 18. At least a part of each extension part 18 overlaps with the access hole 102 in the radial direction.

Next, effects of the ball joint 101 thus configured will be described. Due to the access holes 102, the base portion 12 is provided with access passages 103 that pass in the radial direction to reach the extension parts 18. Due to the access passages 103, it is possible to insert the tool to push out the extension parts 18 radially inward and to make the extension parts 18 undergo bending deformation. As a result of this deformation, the engagement between the locking claws 15 and the panel 5 is released, and the ball joint 101 (more specifically, the socket 10) can be removed easily from the panel 5.

Figure 11:
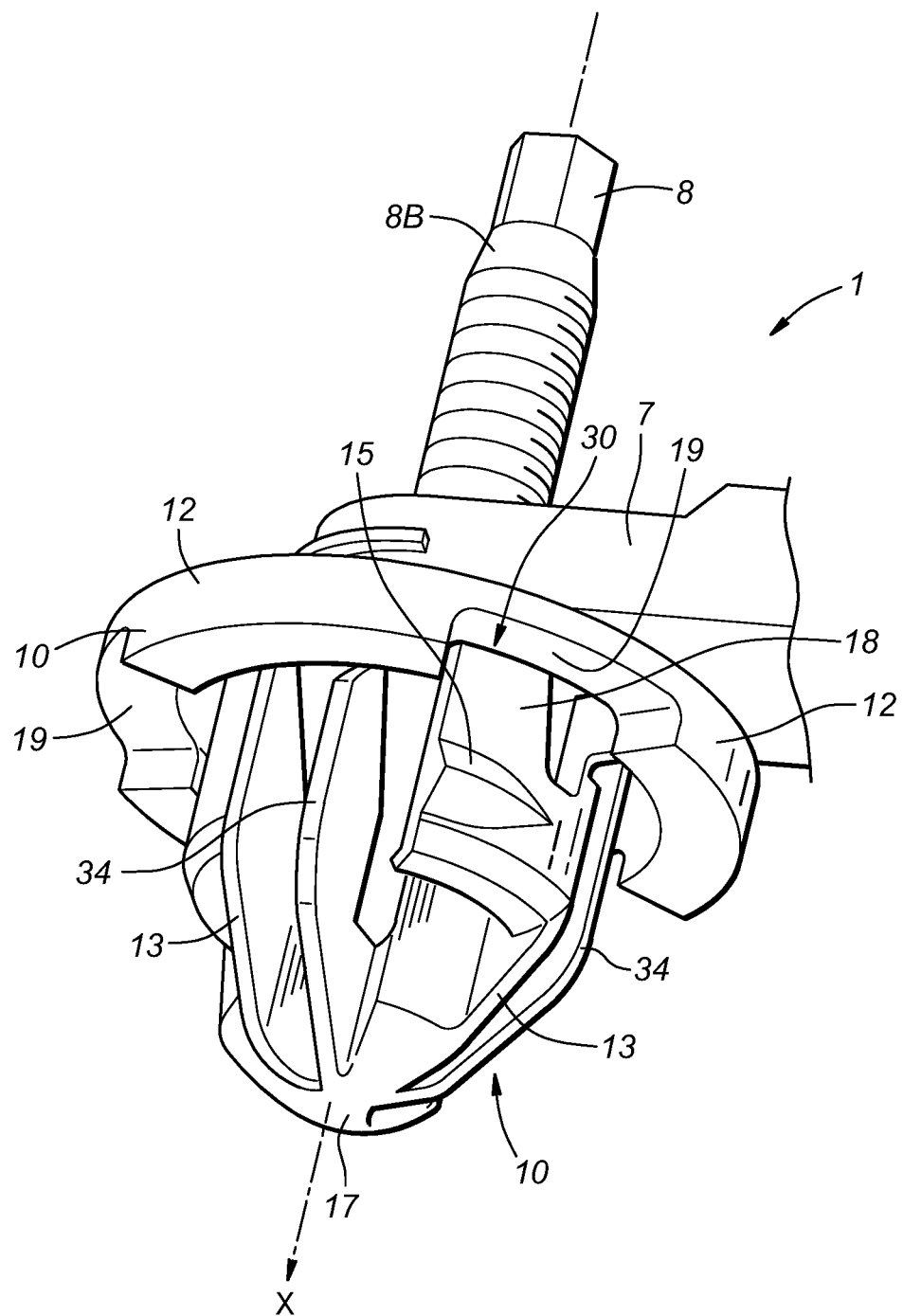
FIG. 11 shows a modification of the ball joint according to the first embodiment.

Concrete embodiments have been described in the foregoing, but the present invention is not limited to the above embodiments and may be modified or altered in various ways. In the above embodiment, the holding parts 14 were provided to protrude rearward (in the insertion direction) from the base portion 12, but are not limited to this embodiment. For example, as shown in FIG. 11, holding parts 34 may extend from the bottom portion 17 of the basket 16 forward, namely, in the direction opposite to the insertion direction to each have a cantilever shape, and the arches 13 and the holding parts 14 each may be configured to be capable of deforming to bend in the radial direction.

In the above embodiment, the ball joint 1 was used to mount the adapter frame 4 supporting the millimeter-wave radar device 2 to the vehicle body 3, but is not limited to this embodiment. For example, the ball joint 1 may be used to fix, to the vehicle body 3, adapter frames supporting various lamps, such as headlamps and tail lamps of a four-wheeled automobile, sonars and vehicle-mounted cameras for acquiring information around the vehicle.

LIST OF REFERENCE NUMERALS 1 ball joint according to first embodiment
5 panel
8 ball stud
8A ball
10 socket
12 base portion
16 basket
18 extension part
19 notch
21 inner reinforcement piece
22 outer reinforcement piece
30 access passage
101 ball joint according to second embodiment
102 access hole
103 access passage
X axis

The invention claimed is:

1. A ball joint comprising a ball stud and a socket for rotatably mounting a ball of the ball stud, the ball joint being configured to be inserted into an opening formed in a panel, the socket comprising:
  a base portion that is annular about an axis extending in an insertion direction;
  multiple first protruding parts that each protrude from the base portion in the insertion direction, each first protruding part being joined together to form an end tip of the socket; and
  second protruding parts that protrude from the base portion in the insertion direction or from extension ends of the first protruding parts in a direction opposite to the insertion direction, each second protruding part being positioned between adjacent ones of the first protruding parts,
  wherein the second protruding parts rotatably hold the ball in cooperation with the tips of the first protruding parts,
  the first protruding parts are each provided with an extension part, each extension part extending laterally from its respective first protruding part in a direction that is substantially orthogonal to the insertion direction,
  an outer surface of each extension part is provided with an engagement part that is configured to engage with an edge part of the opening, and
  the first protruding parts and the second protruding parts are each capable of deforming to bend in a radial direction with respect to the axis,
  wherein tips of the second protruding parts extend further along the insertion direction than side edges of the extension parts,
  wherein the base portion is provided with access passages which penetrate the base portion in the radial direction, the access passages corresponding with the extension parts such that each access passage is aligned with and overlapped by a corresponding one of the extension parts in the radial direction, and
  wherein each access passage is elongated in the radial direction from a radially outer surface of the base portion to an inner surface of the base portion near the corresponding extension part, thereby allowing access to the corresponding extension part.

2. The ball joint according to claim 1, wherein when the ball joint is mounted in the opening of the panel, the panel is positioned between the engagement parts and the base portion and is sandwiched by the engagement parts and the base portion.

3. The ball joint according to claim 2, wherein each extension part forms a cantilever, and
  each engagement part is provided on a free end of its respective extension part.

4. The ball joint according to claim 3, wherein each extension part has a plate-like shape having surfaces facing in the radial direction.

5. The ball joint according to claim 1,
  wherein each access passage is defined as a notch, each notch being recessed in the base portion in a direction opposite the insertion direction.

6. The ball joint according to claim 1,
  wherein each access passage is defined as an access hole, each access hole penetrating the base portion in the radial direction.

7. The ball joint according to claim 1, wherein the second protruding parts protrude from the base portion in the insertion direction, and
  a plate-shaped inner reinforcement piece having surfaces facing in the radial direction is provided at an inner edge of a base end portion of each second protruding part.

8. The ball joint according to claim 7, wherein a plate-shaped outer reinforcement piece having surfaces facing in the radial direction is provided at an outer edge of the base end portion of each second protruding part.

9. The ball joint according to claim 1, wherein a surface of each second protruding part that faces outward in the radial direction is substantially parallel with the insertion direction.

10. The ball joint according to claim 9, wherein when the ball joint is mounted in the opening of the panel, the surface of each second protruding part that faces outward in the radial direction resiliently contacts the edge part defining the opening.

* * * * *